United States Patent [19]

Swanson

[11] Patent Number: 4,762,699
[45] Date of Patent: Aug. 9, 1988

[54] SYNTHESIS OF MOLYBDENUM HEXACARBONYL

[75] Inventor: Wilbur W. Swanson, Ann Arbor, Mich.

[73] Assignee: Amax Inc., Greenwich, Conn.

[21] Appl. No.: 39,865

[22] Filed: Apr. 20, 1987

[51] Int. Cl.$^4$ .................... C01G 1/04; C01G 39/00
[52] U.S. Cl. ..................... 423/417; 423/416; 423/418; 423/606
[58] Field of Search .............. 423/417, 416, 418, 606

[56] References Cited

U.S. PATENT DOCUMENTS

| | | | |
|---|---|---|---|
| 2,952,521 | 9/1960 | Podall | 423/418 |
| 2,952,523 | 9/1960 | Podall | 423/417 |
| 2,952,524 | 9/1960 | Podall | 423/417 |
| 2,963,346 | 12/1960 | Ecke | 423/418 |
| 2,964,387 | 12/1960 | Podall | 423/417 |
| 3,345,144 | 10/1967 | Klopfor et al. | 423/417 |
| 3,810,967 | 5/1974 | Arai et al. | 423/418 |
| 4,476,103 | 10/1984 | Sapienza et al. | 423/417 |

FOREIGN PATENT DOCUMENTS 642486  6/1962  Canada .................. 423/418

Primary Examiner—John Doll
Assistant Examiner—Robert M. Kunemund
Attorney, Agent, or Firm—Michael A. Ciomek; Eugene J. Kalil

[57] ABSTRACT

Molybdenum hexacarbonyl is prepared by carbonylating diammonium oxopentachloromolybdate (V) $(NH_4)_2(MoOCl_5)$ at pressures up to about 2000 psig and temperatures up to about 150° C. in a solvent such as tetrahydrofuran, using a metallic reductant such as magnesium and an oxygen scavenger such as aluminum trichloride.

8 Claims, No Drawings

SYNTHESIS OF MOLYBDENUM HEXACARBONYL

The invention is directed to an improved method for producing molybdenum hexacarbonyl with good yield of product using as a starting material a molybdenum compound which is readily prepared and is stable.

BACKGROUND OF THE INVENTION AND THE PRIOR ART

Molybdenum hexacarbonyl is a material useful in applications such as catalysis and chemical vapor deposition. A commercial method which has been employed in the past to produce molybdenum hexacarbonyl involves reduction of molybdenum pentachloride ($MoCl_5$) by zinc metal in a diethyl ether solution under carbon monoxide pressure. The process is labor intensive and expensive and involves difficult handling problems. An extensive patent literature exists in relation to the production of Group VI metal carbonyl compounds. Thus, U.S. Pat. Nos. 2,267,099, 2,554,194, 2,557,744, 2,952,517, 2,952,523, 2,952,524, 2,964,387, 3,053,628, 3,053,629, 3,000,687, 3,966,886 and 4,476,103 can be mentioned, as can German Pat. Nos. 643,787 and 1,113,688; U.S.S.R. Pat. Nos. 111,382, 149,224, 284,727; and U.K. Pat. Nos. 892,142, 911,953 and 1,251,354.

The patent literature shows preparation of carbonyl compounds including molybdenum hexacarbonyl from a variety of starting materials using a variety of solvents and reducing agents in the carbonylation process. The art still fails to provide an efficient process for producing molybdenum hexacarbonyl at pressures below about 2000 psig and temperatures below about 150° C. from a starting material which is readily prepared and stable as well as being easy to handle.

SUMMARY OF THE INVENTION

In accordance with the invention, molybdenum hexacarbonyl is prepared by reacting under pressure diammonium oxopentachloromolybdate $(NH_4)_2 MoOCl_5$ under pressure with carbon monoxide in a coordinating organic solvent in the presence of at least one reagent from the group consisting of a metallic reductant and an oxygen scavenger. The preferred metallic reductant is magnesium, although zinc, aluminum, sodium, potassium or lithium can be used, while aluminum trichloride or sodium borohydride can be used as oxygen scavengers.

DETAILED DESCRIPTION OF THE INVENTION

Diammonium oxopentachloromolybdate (V) may be prepared from inexpensive starting materials such as ammonium molybdates by electrochemical reduction. The material is a dry green powder which is stable in dry air. Molybdenum hexacarbonyl was prepared from the starting diammonium oxopentachloromolybdate (V) in an autoclave containing the molybdenum compound in a solvent which is preferably tetrahydrofuran. The reactions were run in low concentration, preferably about 5 to 10 grams of molybdenum compound in 200–300 ml of solvent. The autoclave was loaded in the open reactor after which the molybdenum compound and other additives were slowly added so as not to boil over the solvent. The autoclave was closed and pressurized with 1500 psig carbon monoxide with the pressure increasing to 2000 psig at 150° C. The dried powder metal reducing agent was initially placed in an aluminum foil package and tied to the stirring shaft or support pieces. A cutting wire was attached so that when the stirrer was turned on the foil package would be opened and the reducing agent introduced into the reaction mixture, thereby isolating the metal reductant from the remainder of the reaction mixture until after CO pressurization. The mixture was stirred at 1100 rpm. The experiments were conducted using tetrahydrofuran as solvent, magnesium, aluminum and zinc metal powders as reducing metal, aluminum trichloride and sodium borohydride to which a small amount of lithium chloride was added to facilitate solution of the borohydride as oxygen scavenging additives. Little or no yield was obtained when ethyl ether was used as the solvent. Tetrahydrofuran is a coordinating solvent which prevents molybdenum metal byproduct formation. Other useful solvents include dioxane or diglyme.

A number of runs were conducted in a 300 ml autoclave with the results shown in the following table. Run time was 14 hours in all cases except Run 1815-67 in which run time was 2 hours.

TABLE I

Summary of Data for the Preparation of Molybdenum Hexacarbonyl From Diammonium Oxopentachloromolybdate (V)

| Run No. | Lot No. | Reducing Metal (Atomic Ratio/Mo) | Additives Add./Mo | Solvent (Amt. Used) | PSIG | Temp. (C.°) | Yield |
|---|---|---|---|---|---|---|---|
| 1815-66 | 6 | Mg(4.9) | AlCl$_3$(1.0) | Et$_2$O(100 ml) | 1500 | 36 | 1% |
| -70 | 6 | Mg(4.9) | AlCl$_3$(1.0) | Et$_2$O(100 ml) | 1500 | 150 | no |
| -35 | 1 | Zn(4.8) | — | THF(100 ml) | 1500 | 150 | 7% |
| -36 | 1 | Mg(5.0) | — | THF(100 ml) | 1500 | 150 | 13% |
| -37 | 1 | Al(6.7) | — | THF(100 ml) | 1500 | 150 | 2% |
| -44 | 1 | Zn(4.9) | AlCl$_3$(2.0) | THF(100 ml) | 1500 | 150 | 25% |
| -42 | 1 | Mg(5.0) | AlCl$_3$(2.0) | THF(100 ml) | 1500 | 150 | 36% |
| -43 | 1 | Al(6.7) | AlCl$_3$(2.0) | THF(100 ml) | 1500 | 150 | 18% |
| -54 | 1 | Mg(5.0) | — | THF(100 ml) | 1500 | 150 | 11% |
| -55 | 2 | Mg(5.0) | AlCl$_3$(2.0) | THF(100 ml) | 1500 | 150 | 50% |
| -57 | 3 | Mg(4.9) | AlCl$_3$(2.0) | THF(500 ml) | 1500 | 150 | 14% |
| -58 | 4 | Mg(4.8) | AlCl$_3$(1.9) | THF(300 ml) | 1500 | 150 | 48% |
| -59 | 5 | Mg(4.8) | AlCl$_3$(0.5) | THF(300 ml) | 1500 | 150 | 28% |
| -67 | 6 | Mg(4.9) | AlCl$_3$(1.0) | THF(100 ml) | 1500 | 150 | no |
| 1815-04 | 6 | Mg(4.9) | PCl$_3$(2.5) | THF(100 ml) | 1500 | 150 | 11% |
| 1815-72 | 5 | Mg(4.9) | NaBH$_4$(1.0) | THF(100 ml) | 1500 | 150 | 1% |
| -73 | 5 | Mg(4.9) | NaBH$_4$(0.99)LiCl$_3$(0.03) | THF(100 ml) | 1500 | 150 | 89% |
| 1848-01 | 2 | Mg(4.9) | NaBH$_4$(0.99)LiCl$_3$(0.03) | THF(100 ml) | 500 | 150 | 43% |
| -02 | 2&6 | Mg(4.9) | NaBH$_4$(0.99)LiCl$_3$(0.03) | THF(100 ml) | 500 | 100 | 20% |
| -03 | 7 | Mg(4.9) | NaBH$_4$(0.99)LiCl$_3$(0.03) | THF(100 ml) | 500 | 100 | 52% |

TABLE I-continued

| | | Summary of Data for the Preparation of Molybdenum Hexacarbonyl From Diammonium Oxopentachloromolybdate (V) | | | | | |
|---|---|---|---|---|---|---|---|
| Run No. | Lot No. | Reducing Metal (Atomic Ratio/Mo) | Additives Add./Mo | Solvent (Amt. Used) | PSIG | Temp. (C.°) | Yield |
| -05 | 7 | Mg(4.9) | NaBH$_4$(0.99)LiCl$_3$(0.03) | THF(100 ml) | 500 | 100 | 47% |

The results show that yields as high as 89% of molybdenum hexacarbonyl were obtained under relatively mild reactive conditions, i.e., 1500 psig pressure and 150° C. temperature. The results also show that the oxygen contained in diammonium oxopentachloromolybdate (V) does not poison the reaction when an oxygen scavenger is available. In addition, it has been found that it is unnecessary to use organo metallic reducing agents such as alkyl aluminum, alkyl magnesium halide or alkyl lithium.

Experimental results carried out under conditions such as those described hereinbefore show that molybdenum disulfide, molybdenum trioxide and molybdenyl-8-hydroxyquinolate could not be carbonylated. Magnesium is a preferred reducing metal but it was found that aluminum or large quantities of AlCl$_3$ appeared to form a black paste which complicated product recovery.

Ammonium hexamolybdate can be reduced to diammonium oxopentachloromolybdate (V) electrochemically at a cost of about 2.5¢ per pound of molybdenum assuming a power cost of 5¢ per kilowatt hour. This fact, combined with the demonstrated high yields of molybdenum hexacarbonyl obtained when diammonium oxopentachloromolybdate (V) is used in the carbonylation reaction, makes possible economical production of many oil soluble derivatives of molybdenum hexacarbonyl. It is known that such derivatives are useful as lubricants, corrosion inhibitors and plastic additives. In addition, derivatives of ammonium oxopentachloromolybdate (V) can be made which contain ethers, thioethers, alcohols, amines, etc.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

What is claimed is:

1. The method for preparing molybdenum hexacarbonyl which comprises reacting diammonium oxopentachloromolybdate (V) in a coordinating organic solvent with carbon monoxide under pressure between about 500 psi up to about 2000 psi and a temperature of about 100° to about 150° C. in the presence of a metallic reductant and, optionally, an oxygen scavenger.

2. The method in accordance with claim 1 wherein said metallic reductant is selected from the group consisting of magnesium, zinc, aluminum, sodium, potassium and lithium.

3. The method in accordance with claim 1 wherein said oxygen scavenger is selected from the group consisting of aluminum trichloride, sodium borohydride, dioxane and diglyme.

4. The method in accordance with claim 1 wherein said solvents are tetrahydrofuran.

5. The method in accordance with claim 1 wherein said metallic reductant is magnesium powder.

6. The method in accordance with claim 1 wherein said oxygen scavenger is aluminum trichloride.

7. The method in accordance with claim 1 wherein said oxygen scavenger is sodium borohydride.

8. The method in accordance with claim 1 wherein the solvent is tetrahydrofuran, magnesium metal powder is reductant and sodium borohydride is the oxygen scavenger.

* * * * *